United States Patent

Truax et al.

[11] Patent Number: 5,944,264
[45] Date of Patent: Aug. 31, 1999

[54] PORTABLE SEED SPREADER

[75] Inventors: James R. Truax, Crystal; James A. Willmore, Eden Prarie; Benjamin M. Smegal, Robbinsdale; Michael J. Kaluza, Crystal, all of Minn.

[73] Assignee: Truax Company, Minneapolis, Minn.

[21] Appl. No.: 08/995,527

[22] Filed: Dec. 22, 1997

Related U.S. Application Data

[60] Provisional application No. 60/054,429, Aug. 1, 1997.

[51] Int. Cl.$^6$ .......................................................... A01C 3/06
[52] U.S. Cl. .......................... 239/653; 239/152; 239/686; 222/238
[58] Field of Search ..................................... 239/152, 153, 239/154, 653, 681, 683, 684, 686, 687; 222/175, 236, 238, 410, 414

[56] References Cited

U.S. PATENT DOCUMENTS

| | | | |
|---|---|---|---|
| 1,062,766 | 5/1913 | Carter | 222/238 X |
| 1,166,476 | 1/1916 | Parrish | 239/653 X |
| 1,912,172 | 5/1933 | Bailey | 222/238 X |
| 2,514,962 | 7/1950 | McElhatton | 239/686 X |
| 3,040,471 | 6/1962 | Blase | 239/653 |
| 4,030,428 | 6/1977 | Truax . | |

FOREIGN PATENT DOCUMENTS

| | | | |
|---|---|---|---|
| 958297 | 9/1949 | France | 239/686 |

OTHER PUBLICATIONS

P. 26, A.M. Leonard, Jan. 1997 Catalog, A.M. Letter, Inc. 241 Fox Drive, Piqua, Ohio 45356.

*Primary Examiner*—Andres Kashnikow
*Assistant Examiner*—Steven J. Ganey
*Attorney, Agent, or Firm*—Burd, Bartz & Gutenkauf

[57] ABSTRACT

A portable seed spreader for distribution of bulky and irregular size seeds over a local area. The spreader includes a U-shaped frame that carries a housing having a first seed bin and a second seed bin. A first transverse shaft is mounted to legs of the frame and extends through the first seed bin. The first shaft carries agitators for mixing and stirring the seeds in the first seed bin. Discharge slots are located in a bottom wall of the first seed bin. A second transverse shaft is mounted on the frame and extends beneath the bottom wall of the first seed bin. The second transverse shaft carries picker wheels that extend through the discharge slots into the first seed bin to pick seeds therefrom and draw them through the discharge slot. The shafts are connected so that rotation of one transverse shaft as by a hand crank, an electric motor or a wheeled mechanism, results in rotation of the other. A spreader plate is located beneath the discharge slots of the first seed bin and the discharge orifice of the second seed bin. The spreader plate is connected to a vertical shaft that is connected through a gearing arrangement to the second transverse shaft so that the spreader plate rotates upon rotation of the second transverse shaft. An adjustable closure mechanism totally or partially closes the discharge orifice to the second seed bin to regulate the discharge of seeds.

18 Claims, 6 Drawing Sheets

5,944,264

PORTABLE SEED SPREADER

Reference is made to provisional application Ser. No. 60/054,429 filed Aug. 1, 1997.

BACKGROUND OF THE INVENTION

The invention relates to a portable seed spreader for distribution of bulky and difficult to handle seeds. Such seeds, for example, include native grass seeds as buffalo grass, blue stems, Indian, wild rye and others. Such seeds are desirable for planting in areas to be reclaimed, such as land left barren by strip mining or highway construction; or for purposes of prevention of soil erosion, retention of top soil and the like. These seeds are characteristically bulky, low density and irregular in shape and size. These seeds are prone to stick together. They can have intermingled extraneous matter. In some instances it is desirable to have the seed hulls left intact to furnish nourishment to the planted seed. These characteristics of the bulky seeds render their distribution problematic. Such seeds are prone to clog and stick in the seed feeder mechanism. The seed hulls can be lost or damaged.

It is often desirable to intermix these bulk seeds with a more common granular seed to create a more desirable ground cover. This can include a small legume type seed.

Many of the problems associated with spreading such seeds are overcome by the invention of U.S. Pat. No. 4,030,428 issued Jun. 21, 1977 to Truax. That patent discloses a seed drill for distribution of native grass-type seeds. The machine has a large seed hopper for holding the bulky seeds, and a small seed hopper for holding and concurrent distribution of more conventional types of granular seed such as clover and alfalfa. The machine is relatively large and is towed by a tractor. Agitators are located in the large seed bin to agitate the seed and continuously move it toward one or more discharge openings at the bottom of the bin. Picker wheels are located in the discharge openings and pick seed from the bin for discharge to a planting furrow. While useful for planting a large area, the planting of such seeds over a smaller area, or over irregular terrain still requires hand spreading. This is labor intensive and inefficient.

SUMMARY OF THE INVENTION

The invention comprises a portable seed spreader for distribution of bulky seeds with the optional concurrent distribution of a conventional granular seed. The seed spreader includes a U-shaped frame carrying a seed hopper or housing. The hopper is divided into two bins, a first larger bin for carrying and distributing bulky seeds, and a second smaller bin for carrying more conventional granular seeds. The bins are located in side-by-side relationship. A first transverse shaft or drive shaft passes through the first seed bin and is carried by bearings mounted on the U-shaped frame. The first shaft carries agitators for mixing seeds in the first seed bin. A second transverse shaft is also mounted between the legs of the U-shaped frame and is located beneath the housing and vertically beneath the first transverse shaft. A timing belt connects the first and second transverse shafts for rotation together. Discharge slots in the bottom of the housing are open to the first seed bin. A pair of picker wheels are mounted on the second transverse shaft and extend through the discharge openings into the bottom portion of the first seed bin. Rotation of one of the transverse shafts is effective to rotate the other. In one preferred embodiment, a hand crank is connected to the first shaft. Rotation of the first transverse shaft by rotation of the hand crank is effective to rotate the agitators in the first seed bin, as well as rotate the second transverse shaft and the picker wheels so that they pick seeds from the bottom of the first seed bin and drop them to a spreader plate.

The spreader plate is mounted on a vertical spreader plate shaft beneath the seeder housing. The spreader plate shaft is connected through a gear arrangement to the second transverse shaft. As seed drops from the first bin through the discharge openings, it lands upon the spreader plate. Rotation of the spreader plate throws the seeds out over the target area.

The second bin carries smaller granular seed. The second seed bin has a discharge opening located over the spreader plate. An agitator wire or pin extends into the second seed bin to agitate the seed therein and prevent bridging of the seed. The agitator wire is moved by a cam member on the second transverse shaft. A metering plate covers the discharge opening of the second seed bin. The metering plate is movable between a closed position to completely cover the seed discharge opening, and an open position partially or totally uncovering the discharge opening of the second bin.

IN THE DRAWINGS

DESCRIPTION OF A PREFERRED EMBODIMENT

Figure 1:
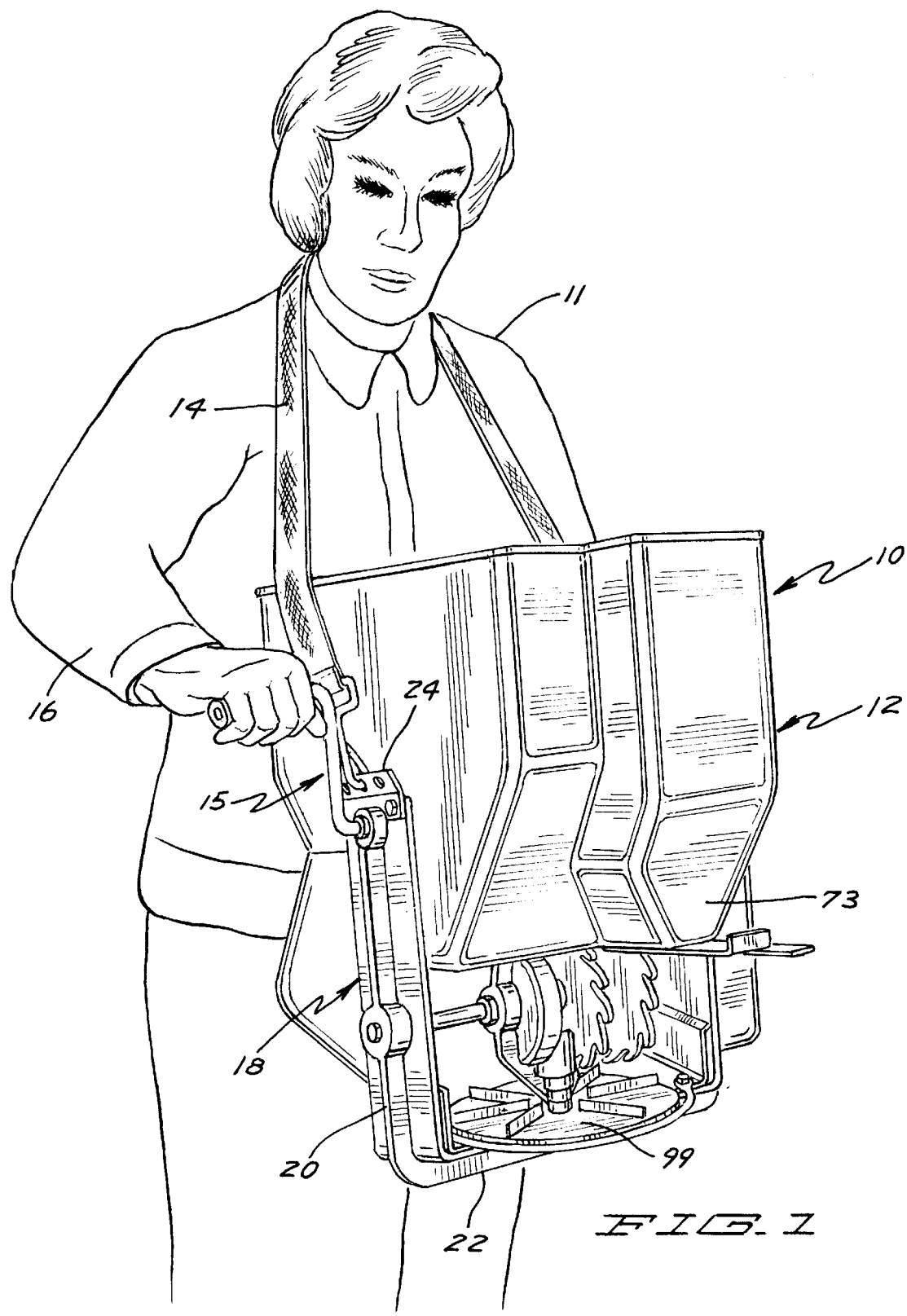
FIG. 1 shows a person manually carrying a hand operated seed spreader according to one preferred embodiment of the invention and operating the device to spread seed.

Referring the to drawings there is shown in FIG. 1 a seed spreader according to one preferred embodiment of the invention, indicated generally at 10, carried by a person 11 spreading seed over terrain.

The spreader 10 includes a housing or hopper 12 that is carried in front of the person 11 by means of a strap 14. Strap 14 is trained over the neck and back of person 11 and is attached to either side of the housing 12. A hand crank 15 with a horizontal handle 17 is operated by the arm and hand 16 of the person 11. The person 11 carries the hand operated seed spreader 10 over the terrain to be seeded which can be a rough or uneven terrain not easily accessible by large machinery, or on the other hand, a small area wherein the use of large machinery is uneconomical and impractical.

Seed spreader 10 can distribute large bulky type fluffy seeds such as native grass seeds in one bin, and concurrently from another bin distribute a second seed of the more granular and conventional type along with the first seed.

Figure 2:
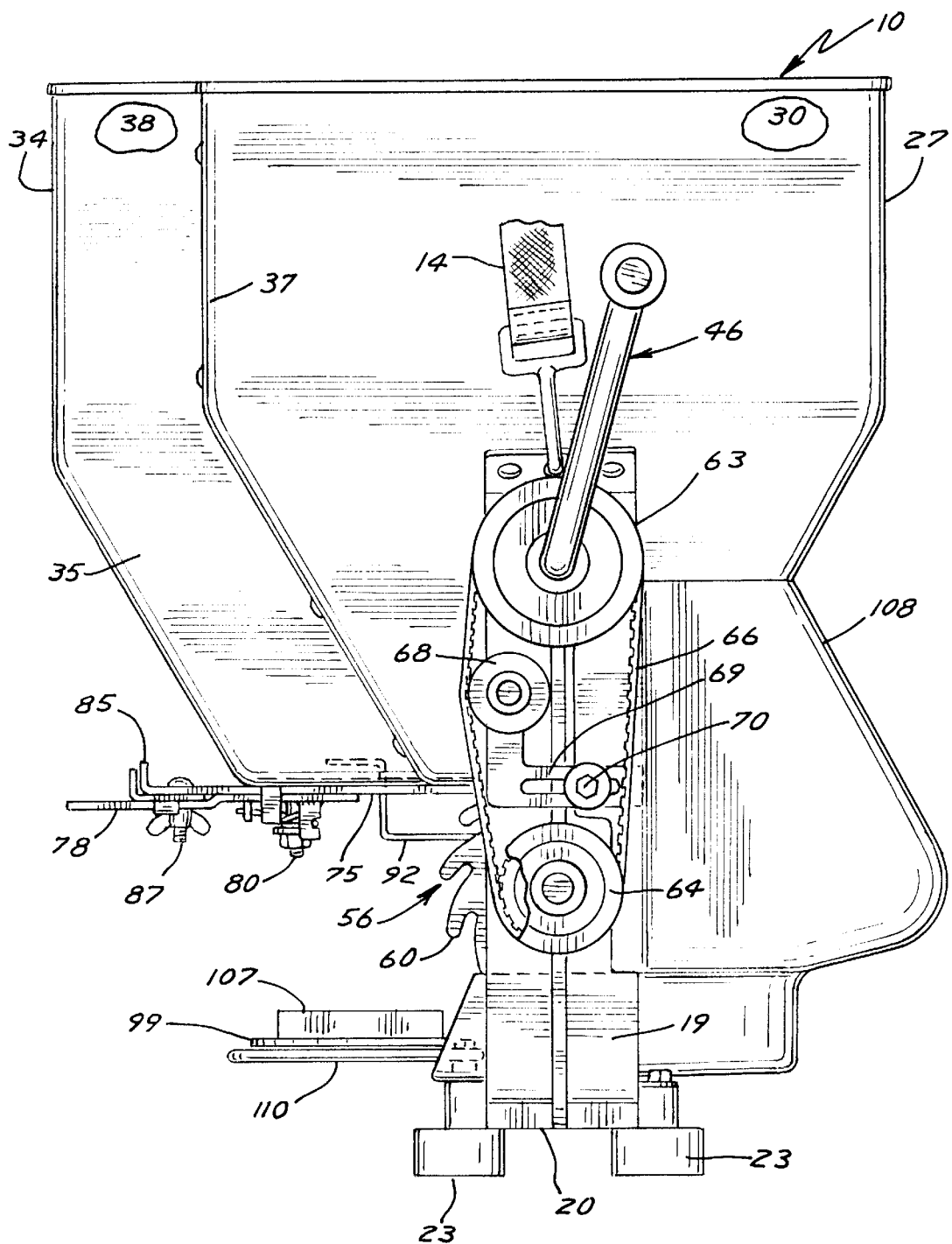
FIG. 2 is a side elevational view of the seed spreader of FIG. 1 showing the side thereof having a power transmission assembly that transfers power between the upper transverse drive shaft and the lower transverse driven shaft, and with the transmission cover removed for purposes of illustration.
Figure 3:
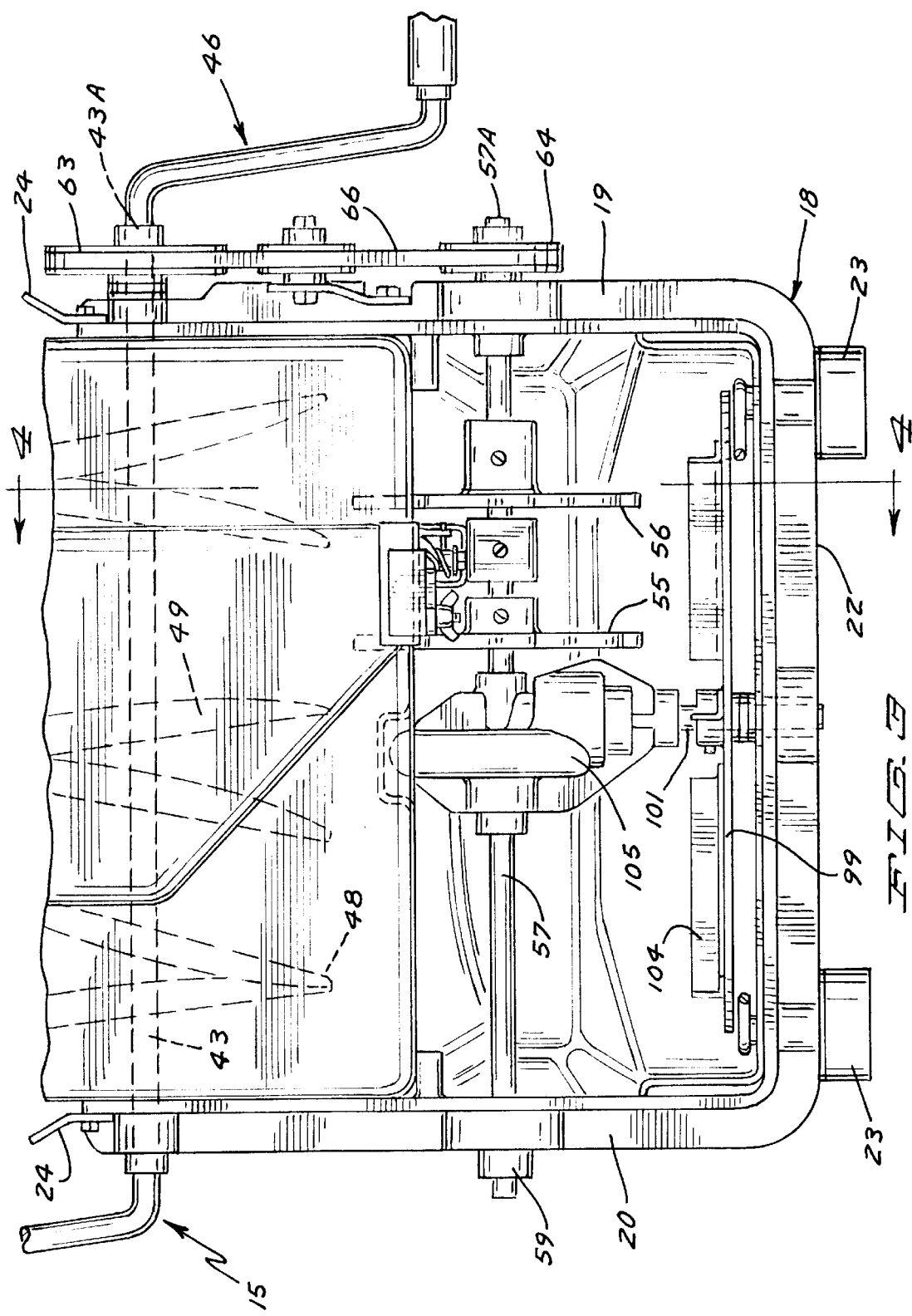
FIG. 3 is an enlarged front elevational view of a portion of the hand operated seed spreader as shown in FIG. 1, showing the bottom portion thereof.

As is shown in FIGS. 1 through 3, the hand operated seed spreader 10 includes a U shaped frame 18 having generally upright legs 19, 20 connected by a base leg 22. The housing 12 is carried between the upright legs 19, 20, elevated above the base leg 22. Feet 23 are attached to the lower part of the base leg 22 for resting the seeder on the ground.

The upper ends of the legs 19, 20 have brackets 24. Snap hooks connect brackets 24 to the carrying strap 14. Bolts 25 that fasten housing 12 to the legs 19, 20 also connect the brackets 24.

Figure 6:
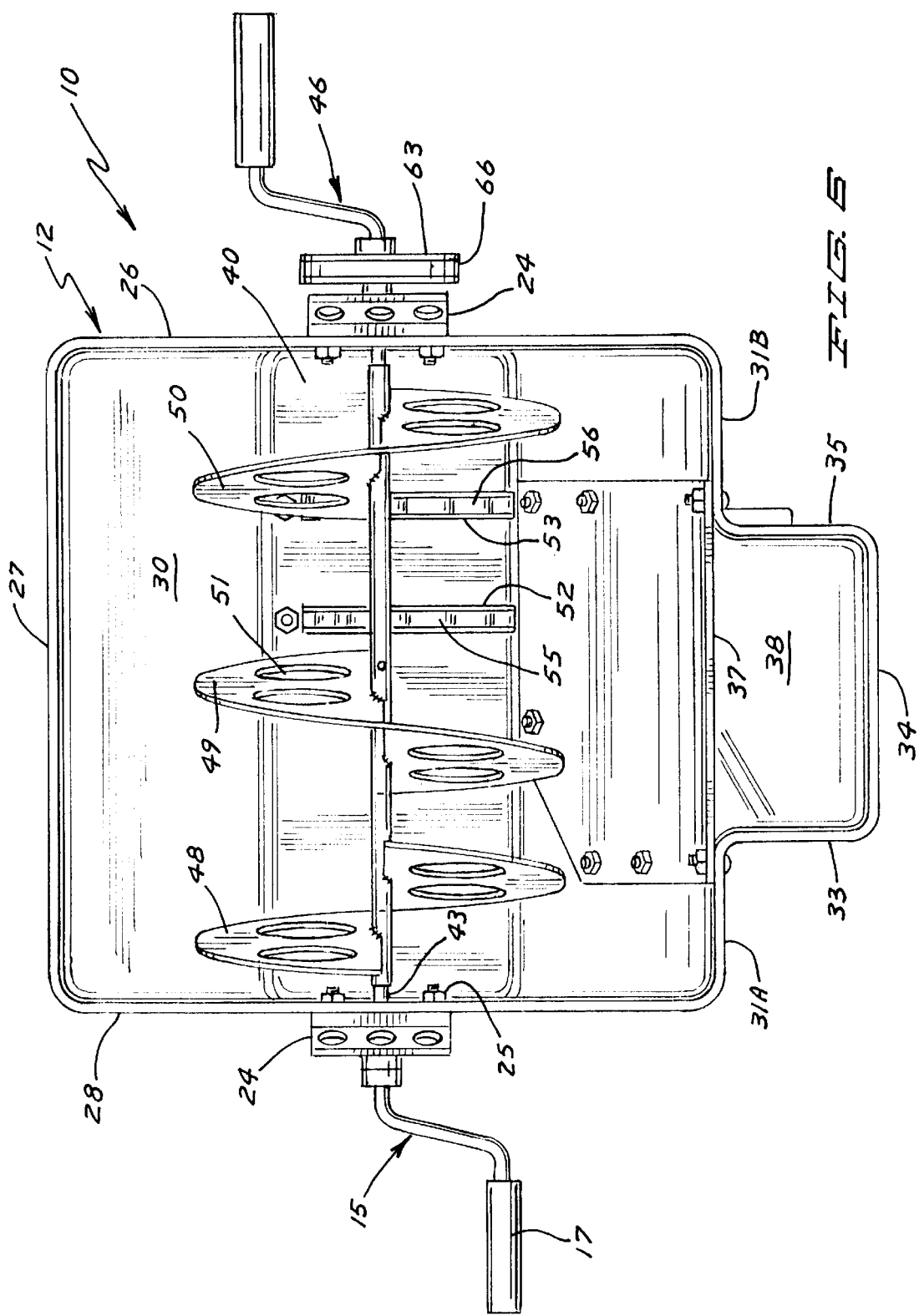
FIG. 6 is an enlarged top plan view of the seed spreader of FIG. 1.

As shown in the top view of FIG. 6, housing 12 is generally rectangular in shape, having a first and larger seed bin and a second, smaller seed bin. Housing 12 has first, second and third sidewalls 26, 27, 28 forming three sides of a large seed bin 30. A fourth side is formed by partial sidewalls 31A, 31B and a divider wall 37.

A small seed bin 38 is formed by smaller sidewalls 33, 34, 35 and divider wall 37. Lateral sidewalls 33, 35 extend from the partial sidewalls 31A, 31B of large seed bin 30. Front sidewall 34 extends between lateral sidewalls 33, 35. Small seed bin 38 is located directly ahead of the large seed bin 30 when the seed spreader 10 is carried in the preferred orientation shown in FIG. 1.

Figure 4:
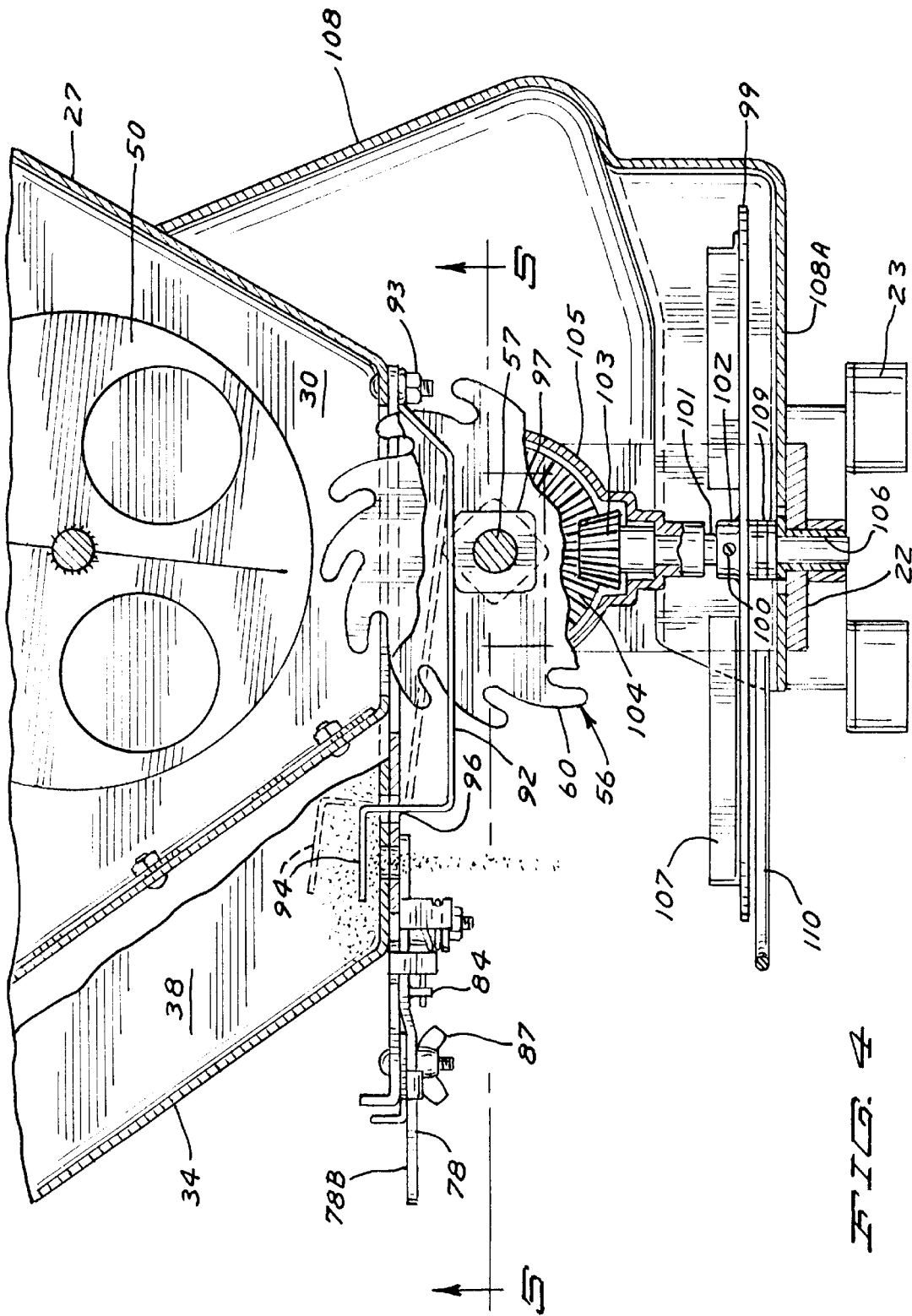
FIG. 4 is a sectional view of a portion of the seed spreader of FIG. 3 taken along the line 4—4 thereof.

As shown in FIGS. 2 and 4, the front and rear sidewalls of housing 12 are vertical at the upper ends when the seed spreader is upright. These walls converge downwardly at a lower portion of housing 12. The walls defining the large bin 30 converge to a large bin bottom wall 40. A first transverse shaft or drive shaft 43 is connected between legs 19, 20 of frame 18. The first transverse shaft passes through the housing 12 and the first seed bin 30. Legs 19, 20 have suitable bearing structure for rotatably carrying shaft 43. One end of shaft 43 is connected to the hand crank 15 on one side of housing 12. A second hand crank 46 is optionally provided connected to the opposite end of shaft 43.

First transverse shaft 43 carries agitators 48, 49, 50. Agitators 48–50 are helical and rotate with the first transverse shaft 43. Each agitator comprises a 360 degree helical flight. The purpose of agitators 48–50 is to continuously churn or stir the seeds located in the large seed bin 30 to inhibit bridging and sticking together of the seeds and move them toward a discharge outlet for distribution. Operation of one or both of the hand cranks 15, 46 turns the agitators 48–50 in the bin 30. The flight blades have openings 51 to enhance stirring of the seeds. Other types of agitators could be used.

Discharge slots 52, 53 are located on the bottom wall 40 of the first seed bin 30. Picker wheels 55, 56 are partially located in the discharge slots and serve to pick seeds from the bottom of the seed bin 30 and drop them.

Picker wheels 55, 56 ride on a second transverse shaft or driven shaft 57. Second shaft 57 is mounted between a lower portion of legs 19, 20 of frame 18, parallel to first shaft 43 and spaced beneath the bottom of housing 12. Ends of shaft 57 are rotatably mounted in bearing assemblies 59 carried by the legs 19, 20. Picker wheels 55, 56 are mounted directly beneath the discharge slots 52, 53 and extend upwardly through the discharge slots such that a portion of each picker wheel is located in the bottom of the first seed bin 30.

Picker wheels 55, 56 are of the type shown and described in U.S. Pat. No. 4,030,428 to Truax (in particular, FIG. 5 of that patent). As shown in FIG. 4, the picker wheel 56 has a plurality of symmetrical, equally spaced forwardly directed fingers 60 along the perimeter thereof. The upper segment of picker wheel 56 passes through the slot 53 of seed bin 30. Upon rotation of the picker wheel 56 on the shaft 57, the fingers 60 follow a path of travel that extends through the lower portion of the seed bin 30 and outwardly thereof. The fingers 60 are effective to grab seeds from the seed bin 30 and pull them down through the discharge slot 53, where they drop to a spreader plate.

Driven shaft 57 is powered upon rotation of drive shaft 43 through a power transmission assembly. One end 43A (FIG. 3) of first shaft 43 extending outward of a frame leg 19 carries a geared pulley 63. A second geared pulley 64 is attached to an end 57A of second shaft 57 extended outward from leg 19. A timing belt 66 is trained between the pulleys 63, 64. A tension wheel 68 (FIG. 2) contacts the interior of timing belt 66 to maintain tension thereon. Tension wheel 68 is mounted on a right angle bracket 69 having an elongate slot mounted on a bolt 70 that is secured to the frame leg 19 for adjustment purposes. A removable cover 72, partially shown in FIG. 1, can cover the power transmission assembly. Rotation of the agitator drive shaft 43 through one or both of the crank arms is effective to rotate the driven shaft 57.

The side walls defining second seed bin 38 taper downwardly to a discharge section indicated at 73 in FIG. 1, and co-planar with the bottom of housing 12. An elongate bottom plate 75 (FIG. 5) closes the discharge section of second seed bin 38. Plate 75 is fastened to the bottom of housing 10 at the rear thereof by nuts and bolts 76, and extends forward, outward of the front of the housing 12 in covering relationship to the discharge section 73. Bottom plate 75 has a discharge orifice 77 beneath the second seed bin 38.

A metering mechanism is effective to partially or totally cover the discharge orifice 77 to regulate the amount of seed dispensed. A metering plate 78 is pivoted to a pivot post 80 fastened to the bottom plate 75. One end 78A of metering plate 78 is movable between positions of covering and uncovering the discharge orifice 77 upon rotation of metering plate 78 about pivot post 80.

A spring 81 is wrapped around the post 80. One end of spring 81 is fastened to an anchor 84 that is fastened to meter plate 78. The other end of the spring 80 is fastened to an anchor 82 which is secured to the bottom plate 75. Spring 81 biases the metering plate 78 in a pivotal direction toward covering the discharge orifice 77.

A latch plate 85 is fastened to the outward end of the bottom plate 75. A wing nut and bolt assembly 87 passes through a slot in the base plate 75 and through an opening in the latch plate 85 that enables lateral adjustment of the latch plate 85 with respect to the bottom plate 75. The latch plate 85 carries a stop member 88. The stop member 88 bears against the metering plate 78 when it is in a position such that the orifice 77 is totally or partially opened.

Figure 5:
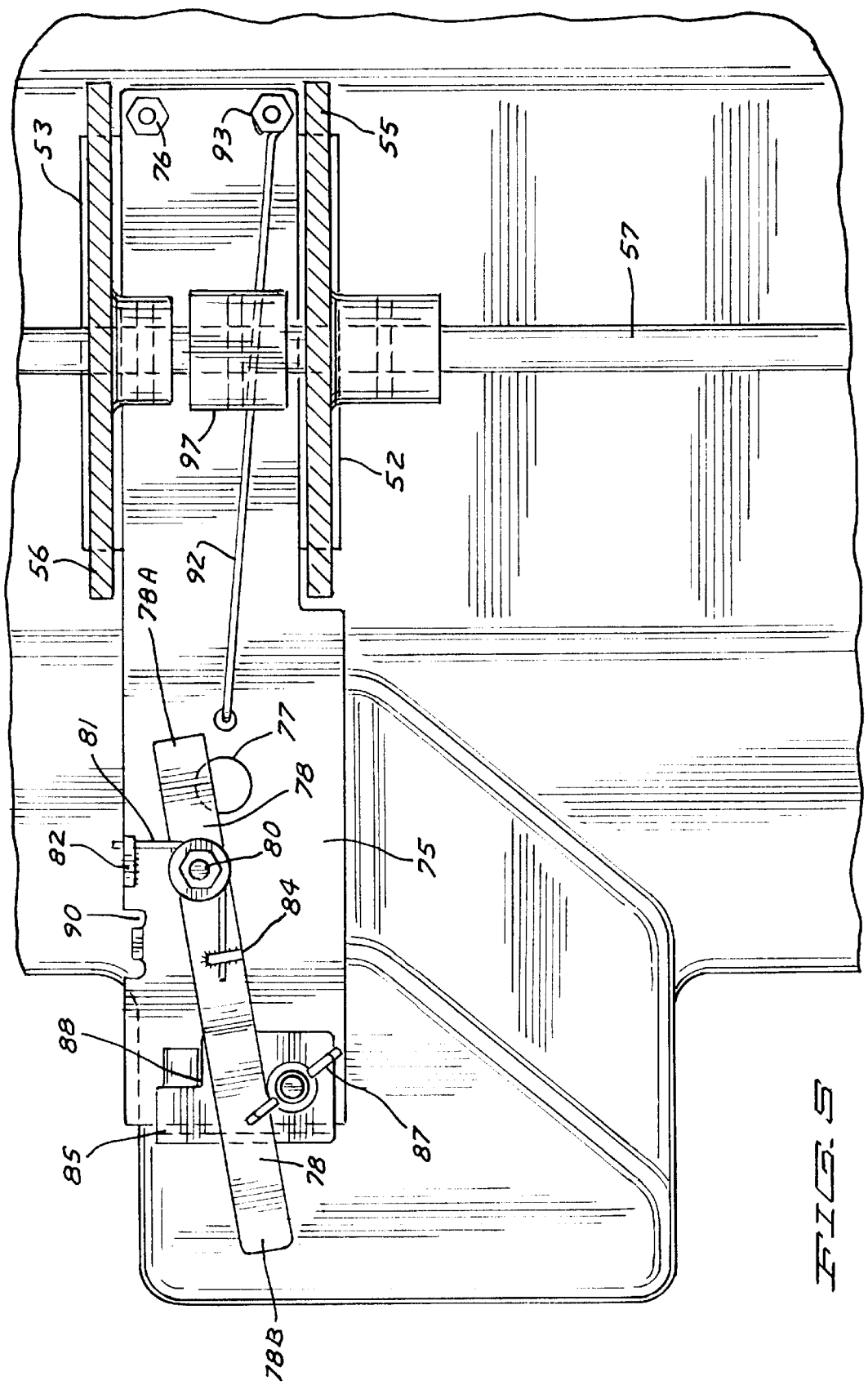
FIG. 5 is an enlarged sectional view of a portion of the seed spreader of FIG. 4 taken along the line 5—5 thereof.

The position of metering plate end 78A over orifice 77 is regulated by the lateral position of the latch plate 85 on the end of the bottom plate 75. This is seen in FIG. 5. The end 78B of the metering plate 78 bears against the stop 88. Lateral back and forth adjustment of the latch plate 85 is effective to determine the amount of closure of the opposite end 78A of metering plate 78 over orifice 77.

The end 78B of metering plate 78 can be depressed in amount sufficient to enable it to clear the stop 88. The spring 81 biases the latch plate 78 in a direction towards closure of the orifice 77. The latch plate 78 is restrained from further movement by a second stop 90 located on the bottom plate 75. In this position the inner end 78A of the latch plate 78 covers the discharge orifice 77. Manipulation of the outer end 78B of latch plate 78 is effective to open and close the discharge opening 77.

Seeds in the second seed bin 38 are stirred or agitated by means of a mixer wire 92 (FIGS. 4 and 5). One end of mixer wire 92 is fastened on the bottom side of the bottom plate 75 at the rearward end thereof by means of a nut and bolt 93. A free end extends through an opening 96 in the bottom plate 75 located beneath the discharge section of the second seed bin 38 just behind the discharge orifice 77. The free end 94 of the mixer wire 92 is step-shaped, having horizontal and vertical components in the seed bin 38. The mid-section of the mixer wire 92 rides on a square cam 97 mounted on the shaft 57. As the shaft 57 rotates, the corners of the square cam 97 move the mixer wire 92 in reciprocating or up-and-down fashion along with the free end 94 in the seed bin 38 to mix and agitate the seeds in the seed bin 38.

A spreader plate 99 (FIGS. 2–4) is rotatably mounted beneath the housing 12 and is positioned for receipt of seeds dropped from each of the seed bins. A vertical spreader plate shaft 101 is connected by a set-screw 100 to a central hub 102 of spreader plate 99. Spreader plate 99 rests on bearing washers 109 that are disposed on top of a T-shaped bushing 106. The stem of bushing 106 passes through an opening in base leg 22. Vertical spreader plate shaft 101 is retained in bushing 106.

A gear mechanism connected to the driven shaft or second shaft 57 is effective to rotate the spreader plate shaft 101 and spreader plate 99 upon rotation of the drive shaft 43. The upper end of the spreader plate shaft 101 carries a first bevel gear 103. A second bevel gear 104 is mounted on the second shaft 57. The second bevel gear 104 meshes with the first bevel gear 103. Rotation of the second bevel gear 104 upon rotation of the driven shaft 57 is effective to rotate the spreader plate 99. A cover 105 covers the gear mechanism of the first and second bevel gears 103, 104.

The top of spreader plate 99 carries a plurality of radial vanes 107. Vanes 107 act to sling seeds radially outward on spreader plate 99 when it is rotated.

A cowling 108 is mounted to the rear of housing 12. Cowling 108 spans the rear portion of the seeder from the housing 12 to the base leg 22 of frame 18. Cowling 108 closes the rear of the spreader such that the only available opening for the discharge of seeds is at the front thereof. The purpose of cowling 108 is to prevent rearward discharge of seeds. A bottom wall 108A of cowling 108 provides a floor beneath spreader plate 99.

A curved guard rail 110 is horizontally positioned and forwardly extended from the base leg 22 of frame 18. Guard rail 110 extends out beyond the outer perimeter of the spreader plate 107 and serves to protect it.

In the use of the seed spreader 10, bulky seeds are loaded into the first and main seed bin 30. This will include fluffy seeds such as certain native grass seeds and certain wild flower seeds, characterized by being low density and irregular in length and shape, having a propensity to stick together. A second, more conventional granular seed is loaded in the second seed bin 38 if desired. The spreader device is manually carried by a person over the target field. The drive shaft 43 is rotated by manual operation of the crank 15 or the crank 46 or both. Agitators 48, 49, 50 stir the bulk seeds in the main seed bin 30. The picker wheels 55, 56 grab individual seeds and drop them through the discharge slots 52, 53. The seeds land upon the spreader plate 99 which is also rotating under the influence of rotation of the drive shaft 43. Spreader plate 99 is effective to throw the seeds outwardly in front of the seed spreader 10.

The second seeds in the second seed bin 38 are discharged through the discharge orifice 77 regulated by the amount of closure thereof by the metering plate 78. In some instances, the metering plate 78 can completely close the discharge opening 77 to prohibit the discharge of any seeds therefrom. The seeds in the second bin 38 are agitated by the agitator wire 92 so as to prevent sticking and bridging.

As shown seeder 10 is operated by a hand crank. Other power means could be provided. The portable seed spreader could be carried on an all-terrain type vehicle, with one of the traverse shafts driven by an electric motor powered by the vehicle battery. Alternatively the portable seed spreader can be mounted on wheels, with one of the transverse shafts connected to the wheel mechanism to be powered thereby.

While there has been shown and described a preferred embodiment of the invention, it is understood that changes in structures, materials and relationships between the structures can be made by those skilled in the art without departing from the invention.

The embodiments of the invention in which an exclusive property or privilege is claimed are defined as follows:

1. A hand operated seed spreader comprising:

a housing having side walls defining a first seed bin:

strap means attached directly or indirectly to the housing for manually carrying the seed spreader;

a first shaft horizontally extended through the first seed bin;

means mounting the first shaft for axial rotation in the first seed bin;

agitator means carried by the first shaft in the first seed bin;

said first seed bin having a bottom wall;

a second shaft;

means rotatably mounting the second shaft parallel to the first shaft and spaced beneath the first shaft and the housing;

a hand crank connected to one of said first and second shafts for rotation of the first or second shaft;

means connecting the first and second shafts so that upon rotation of one of the first and second shafts the other shaft rotates;

at least one discharge slot in the bottom wall of the first seed bin;

a picker wheel corresponding to said at least one discharge slot mounted on the second shaft with a segment extending through the at least one discharge slot and into the first seed bin in order to pick seeds from the seed first bin and transport them through the discharge slot;

a spreader plate rotatably mounted beneath the at least one discharge slot, of the first seed bin;

means connecting the spreader plate and the second shaft for rotation of the spreader plate about an upright axis upon rotation of the second shaft;

a second seed bin defined by sidewalls of said housing;

said second seed bin having a bottom wall with a discharge orifice poised over the spreader plate;

adjustable means closing the discharge orifice;

an agitator wire having a free end located in the second seed bin and a fixed end fixed to the housing;

a square cam member on the second shaft;

said agitator wire having a mid portion riding on the square cam in order to produce movement of the free end of the agitator wire in the second seed bin to agitate seeds located therein.

2. A hand operated seed spreader comprising:

a housing having side walls defining a first seed bin;

strap means attached directly or indirectly to the housing for manually carrying the seed spreader;

a first shaft horizontally extended through the first seed bin;

means mounting the first shaft for axial rotation in the first seed bin;

agitator means carried by the first shaft in the first seed bin;

said first seed bin having a bottom wall;

a second shaft;

means rotatably mounting the second shaft parallel to the first shaft and spaced beneath the first shaft and the housing;

at least one discharge slot in the bottom wall of the first seed bin;

a picker wheel corresponding to said at least one discharge slot mounted on the second shaft with a segment extending through the at least one discharge slot and into the first seed bin in order to pick seeds from the seed first bin and transport them through the discharge slot;

a spreader plate rotatable mounted beneath the at least one discharge slot of the first seed bin;

means connecting the spreader plate and the second shaft for rotation of the spreader plate about an upright axis upon rotation of the second shaft;

a hand crank connected to the first shaft for rotation of the first shaft;

a first pulley on the first shaft;

a second pulley on the second shaft;

a drive belt connecting the first and second pulleys so that the second shaft rotates upon rotation of the first shaft.

3. The hand operated seed spreader of claim 2 wherein:

said first and second pulleys are geared pulleys;

said drive belt being a timing belt.

4. The hand operated seed spreader of claim 2 including:

a U-shaped frame having a pair of upright side legs and a base leg;

said housing supported between the upright legs of the frame;

said first and second shafts mounted between the uprights legs of the frame;

a spreader plate shaft mounted in a upright orientation on the base leg of the frame;

said spreader plate rotatably mounted on the spreader plate shaft;

gear means connecting the spreader plate shaft to the second shaft for rotation of the spreader plate shaft upon rotation of the second shaft.

5. The hand operated seed spreader of claim 4 wherein:

said gear means includes a first bevel gear attached to the upper end of the spreader plate shaft;

a second bevel gear affixed to the second shaft, said first and second bevel gears being in meshing engagement whereupon rotation of the second shaft is effective to rotate the spreader plate shaft.

6. The hand operated seed spreader of claim 4 wherein:

said agitator means on the first shaft is comprised as helical flights.

7. The hand operated seed spreader of claim 6 including:

a plurality of discharge slots located in the bottom wall of the first seed bin;

a corresponding plurality of picker wheels located on the second shaft.

8. The hand operated seed spreader of claim 7 wherein:

said picker wheels are of the type having forwardly directed picker fingers.

9. The hand operated seed spreader of claim 4 wherein:

said housing walls define a second seed bin adjacent the first seed bin;

said second seed bin having a bottom wall and a discharge orifice in the bottom wall poised over the spreader plate;

adjustable closure means movable with respect to the discharge orifice between first a position totally closing the discharge orifice, and a second position partially closing the discharge orifice or completely clear of the discharge orifice.

10. The hand operated seed spreader of claim 9 wherein:

adjustable closure means includes a metering plate pivotally mounted to the bottom wall of the second seed bin, having a first end movable between said first and second positions.

11. The hand operated seed spreader of claim 10 including:

spring means biasing the metering plate toward the first position, and adjustable stop means to hold the metering plate in the second position.

12. A portable seed spreader comprising:

a portable U-shaped frame having first and second upright legs and a base leg connecting the lower ends of the first and second upright legs;

an upwardly open housing connected between the first and second legs of the frame;

said housing having side walls and a bottom wall defining a first seed bin for bulky or fluffy seeds, with said bottom wall spaced above the base leg of the frame;

a first transverse shaft extending through the first seed bin with ends rotatably assembled to the first and second upright legs of the frame for axial rotation in the first seed bin;

agitator means carried by the first transverse shaft in said first seed bin;

a second transverse shaft parallel to the first transverse shaft and extended between the first and second upright legs of the frame with ends rotatably assembled for axial rotation therein;

said second transverse shaft being spaced beneath the bottom wall of the first seed bin;

means connecting the first and second transverse shafts so that the first and second transverse shafts rotate together;

means for rotation of one of the first and second transverse shafts;

at least one discharge slot in the bottom wall of the first seed bin;

a picker wheel corresponding to said at least one discharge slot, mounted on the second transverse shaft with a segment extending through the at least one discharge slot and into the first seed bin in order to pick seeds from the first seed bin and transport them through the discharge slot;

a spreader plate located beneath the at least one discharge slot of the first seed bin;

means connecting the spreader plate and the second transverse shaft for rotation of the spreader plate about an upright axis upon rotation of the second transverse shaft;

a second seed bin defined by side walls of said housing;

said second seed bin having a bottom wall with a discharge orifice poised over the spreader plate;

means adjustably closing the discharge orifice of the second seed bin.

13. The portable seed spreader of claim 12 wherein:

said agitator means on the first transverse shaft comprises helical flights.

14. The portable seed spreader of claim 12 wherein:

means for rotation of one of the transverse shafts comprises a hand crank.

15. The portable seed spreader of claim 12 wherein:

said means connecting the first and second transverse shafts for rotation together includes a first pulley connected to an end of the first transverse shaft, a second pulley connected to an end of the second transverse shaft on the same side of the housing as the first pulley, and a drive belt connecting the first and second pulleys.

16. The portable seed spreader of claim 15 wherein:

said first and second pulleys are geared pulleys;

said drive belt is a timing belt.

17. The portable seed spreader of claim 12 including:

a plurality of discharge slots located in the bottom wall of the first seed bin;

a corresponding plurality of picker wheels located on the second transverse shaft.

18. The portable seed spreader of claim 17 including:

an agitator wire having a free end located in the second seed bin, and a fixed end fixed to the bottom of the housing;

a square cam member located on the second transverse shaft;

said agitator wire having a portion passing over the square cam member so that rotation of the second transverse shaft results in reciprocal movement of the agitator wire in the second seed bin to agitate seeds therein.

* * * * *